Dec. 24, 1963     D. D. MUSGRAVE     3,115,337
VARIABLE SPRING
Filed Dec. 13, 1961
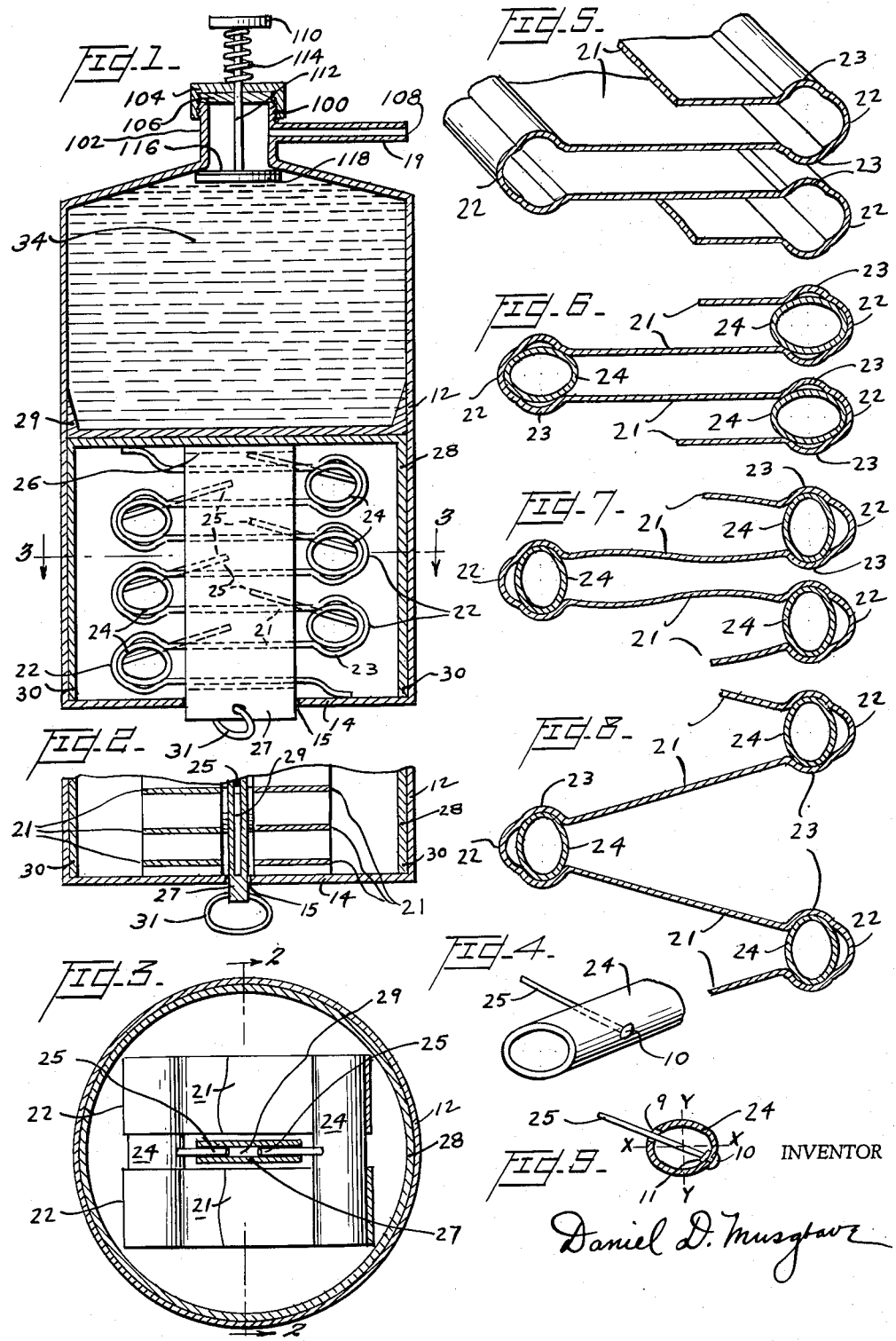
INVENTOR
Daniel D. Musgrave

United States Patent Office 3,115,337
Patented Dec. 24, 1963

3,115,337
VARIABLE SPRING
Daniel D. Musgrave, Cabin John, Md.
Filed Dec. 13, 1961, Ser. No. 159,493
4 Claims. (Cl. 267—1)

This invention relates generally to a spring and more particularly to a spring the resilience of which may be varied or adjusted.

Some mechanisms that include springs as parts thereof are required to be stored for long periods of time in their assembled state or condition, and while the material of which such springs are made may not be under compression or tension approaching the elastic limits of the material, nevertheless the spring may lose part of its resilience and acquire a permanent set. This permanent set may be so extensive that when the mechanism is called upon to perform its designed function, the mechanical results obtained may not meet the high performance specified for the mechanism.

This invention provides a construction of a spring assembly that may be installed in a mechanism in a spring-relaxed condition and immediately before a desired use of the mechanism, the spring may be adjusted mechanically, without removal from the mechanism, to its full operational-designed resilience.

The invention will be disclosed herein as applied to a pressure-operated dispenser for a liquid, but it should be understood that this is for illustrative purposes only and the invention may be applied to other mechanisms. In my co-pending application Number 93,745, now Patent Number 3,039,221, issued June 19, 1962, the spring is applied to a cartridge magazine for a firearm. Another example of use would be in situations where the working thrust of a spring must be controlled within close limits, but the spring must be installed and stand by to await the signal for use. Such situations occur in missile applications, and elsewhere.

In consideration of the foregoing, the principal object of this invention is to provide a spring which can be quickly adjusted from no-load to maximum thrust while installed in a minimum space.

Another object is to provide a variable-resilience spring which can be fabricated with predetermined thrust characteristics and stored without load between the surfaces upon which the predetermined thrust and reaction are intended to act or react.

These and other objects of the present invention will become more apparent upon reference to the following specification, taken in connection with the accompanying drawings, wherein:

FIGURE 1 is a sectional view of a pressure-operated liquid dispenser incorporating a variable spring on the principle of this invention.

FIGURE 2 is a sectional view taken at a right angle to the plane of FIGURE 1, and indicated by numerals 2—2 on FIG. 3.

FIGURE 3 is a horizontal section along the lines 3—3 of FIGURE 1.

FIGURE 4 is a perspective view of an elliptical spring.

FIGURE 5 is a perspective view of a portion of a folded longitudinal spring in its free or no-load state.

FIGURE 6 is a sectioned view of the longitudinal spring shown in FIGURE 5 with elliptical, tubular springs inserted in its vertices.

FIGURE 7 is similar to FIGURE 6, with the exception that the elliptical, tubular springs are oriented differently.

FIGURE 8 is similar to FIGURE 7, with the exception that the longitudinal spring is extended.

FIGURE 9 is a section through an elliptical spring showing details of its rotating lever.

Referring to the drawings, there is shown in FIGURES 1, 2 and 3 a pressure-operated liquid dispenser having a cylindrical case 12 with a flat base 14. At the upper end of case 12 is formed neck 102 to which is attached cap 104. The threads connecting cap 104 to neck 102 are indicated at 100, on FIGURE 1. Case 12 may be fabricated of sheet metal or any other suitable material.

Formed on neck 102 is spout 19 having an orifice 108 which is adapted to discharge fluid from neck 102. Neck 102 is normally empty of the fluid to be discharged as it is closed off from the lower part of case 12 by spring-loaded valve 118, carried on stem 112. Valve 118 is urged to a normally-closed position by spring 114 which encircles stem 112 and exerts a thrust against button 110 fixed on the end of stem 112. The valve is opened by manual pressure on button 110. A seal, 106, is interposed between cap 104 and the end of neck 102. Cap 104 and seal 106 are pierced to permit stem 112 to slide through them in the well-known manner. Valve 118 carries a flat compression seal 116.

Disposed within case 12 is slidable piston 28 with a flexible seal 29 affixed to it by gluing or any other suitable method. The portion of case 12 between valve 118 and seal 29 of piston 28 may be filled with a liquid 34 which might be intended for some emergency use, such as extinguishing a fire. Skirt 30 of piston 28 rests on bottom 14 of case 12 when the dispenser is filled with liquid.

Also disposed in case 12, within piston 28 is a thrust spring assembly consisting of a pair of folded longitudinal springs 21 and one or more elliptical, tubular springs 24. The general arrangement of the spring assembly is shown in FIGURES 1, 2 and 3.

FIGURES 4 and 9 show one elliptical spring 24 in detail. It may be fabricated of any suitable material, such as spring steel. Its major axis is indicated by line X—X and its minor axis by line Y—Y. Affixed to spring 24 is lever 25 which is adapted to rotate spring 24 on its longitudinal axis as will be described later. Upset portions 10 and 11 may be used to rivet one end of lever 25 to spring 24, while the shaft of lever 25 is inserted through hole 9 in spring 24 without rigid connection, so as not to impair the resilience of the tubular spring.

FIGURE 5 shows a portion of a folded longitudinal spring 21 in its free or no-load state, before insertion of elliptical springs 24. Longitudinal spring 21 has at each fold, vertices 22, which, as may be noted in FIGURE 6, comprise a portion of an ellipse having its major axis oriented substantially parallel to the flat portions of spring 21. At the minor axis of the incomplete ellipse are formed detent grooves 23, the purpose of which will be explained later. While longitudinal spring 21 is disclosed herein as having a rectangular, or leaf, cross-section, it could as well be made with a circular, or wire, cross-section. It is not intended to limit the invention as the figures are merely illustrative of one embodiment of the principle, which is capable of being applied in other arrangements.

In FIGURE 6, it will be noted that elliptical springs 24 have been inserted into vertices 22. The dimensions of these parts are so chosen that elliptical springs 24 fit snugly into vertices 22 when their axes are similarly aligned, as shown in FIGURE 6. When the dimensions are so selected, the insertion of the elliptical springs into the vertices as shown in FIGURE 6 will cause no significant torsion of longitudinal spring 21. The contacting surfaces of longitudinal springs 21 and elliptical springs 24 may be coated with some substance having a low coefficient of friction, such as Teflon.

In FIGURE 7, elliptical springs 24 have been rotated 90°, thus aligning their major axes with detents 23 and torsioning longitudinal spring 21. The torsion of the longitudinal spring exerts a pincer effect at detents 23 thus firmly gripping elliptical springs 24 and retaining them in the position shown in FIGURE 7.

Another effect of the torsion of longitudinal spring 21 as illustrated in FIGURE 7 is a tendency for the spring to expand between adjacent vertices in an effort to achieve the no-load condition shown in FIGURE 8. It is not intended, however, to limit the invention to the torsion conditions shown. The principle of the present invention may be applied to various combinations of torsion and distortion in the longitudinal spring and the elliptical spring. It is obvious that compression of the elliptical spring along its major axis can be utilized to store energy.

The installation of a spring assembly (as shown in FIGURE 6) into case 12, will be understood by reference to FIGURES 1, 2 and 3. In the bottom 14 of case 12, there is formed a slot 15 through which protrudes a slotted plate 27 having a pull cord 31 attached to the protruding portion. Formed in plate 27 is slot 29 into which levers 25 may extend as shown in FIGURE 1. It will be noted in FIGURE 1 that when the plate and springs are assembled, levers 25 are angled slightly upward and that the topmost of the levers is touching the top 26 of slot 29 in plate 27 and is thus retaining the plate in position.

In FIGURES 2, 3 and 4 of the disclosed embodiment, it will be noted that each ellipse is capable of being inserted into two longitudinal springs, but it will readily be apparent that more or less longitudinal springs can be employed. In the embodiment shown plate 27 is located between the two longitudinal springs 21 but the location is not critical although it is a convenient arrangement.

*Operation.*—The dispenser shown in FIGURE 1 is in the filled, stand by status. Piston 28 is resting against bottom 14 and valve 118 is held closed by spring 114. The space between the piston and the valve is occupied by the stored liquid. The condition of the thrust spring assembly (consisting of longitudinal springs 21 and elliptical springs 24) is shown on a larger scale in FIGURE 6. Plate 27 with pull cord 31 attached is protruding from the bottom of the dispenser and serves as an indicator that the thrust spring assembly is in the inactive, or stand by status. The dispenser can remain in this status for extended periods of time, and in various changes of environment, as it is not necessary to maintain a high internal pressure in case 12. Such pressure can be provided as needed by action of the thrust spring assembly. Coating of the contacting surfaces of longitudinal springs 21 and elliptical springs 24 as described hereinbefore may be necessary when it is desirable to utilize a spring with a considerable thrust capacity, requiring, of course, considerable torsion.

When the user desires to activate the dispenser he pulls plate 27 out through slot 15 by means of pull cord 31 and plate 27 is discarded. Movement of the plate causes top 26 of slot 27 to contact levers 25 and successively rotate elliptical springs 24 a quarter of a turn. Thereupon, the thrust spring assembly assumes the state shown in FIGURE 7 with the assembly tending to expand substantially at right angles to the flat portions of longitudinal spring 21. The spring therefore exerts a driving force between bottom 14 and piston 28.

Pressure on the piston is transmitted to liquid 34. If valve 118 is now opened by manually depressing button 110 hydraulic pressure will cause liquid 34 to be discharged through orifice 108 of spout 19.

When the piston has reached the limit of its travel toward neck 102 the thrust spring assembly will take the shape shown in FIGURE 8.

There is thus disclosed a spring assembly that may be installed in a mechanism in a relaxed or no-load condition and activated or put to work without the necessity for changing the distance between the surfaces against which the spring acts or reacts. This may be termed a variable spring as the effect may be applied by increments if it is not desired to use the full thrust of the spring.

It is desired to point out that changes may be made without departing from the spirit of the invention. For example, the vertices of the longitudinal springs may be staggered or pyramided to permit the assembly to be made smaller and other methods may be employed to rotate the elliptical springs.

What I claim is:

1. A spring comprising: a plurality of pairs of longitudinal portions of resilient material and partial elliptical portions therebetween; said partial elliptical portions having major axes in planes intermediate the respective planes of the adjacent longitudinal portions and minor axes at right angles to said major axes; tubular elliptical members inserted in said partial elliptical portions, with the major axes of said members coinciding with the major axes of said partial elliptical portions; and means for axially rotating said members relative to said partial elliptical portions.

2. The combination set forth in claim 1 and further characterized by the sections of said partial elliptical portions at the minor axes thereof having indents in the inner surfaces thereof for resiliently engaging the portions of said members at the ends of the major axes thereof.

3. A spring comprising, a pair of longitudinal portions of resilient material and a partial elliptical portion therebetween, said partial elliptical portion having a major axis in a plane intermediate the planes of the adjacent longitudinal portions and a minor axis at right angles to said major axis, and means positionally adjustable within said partial elliptical portion for increasing or decreasing the spacing at the minor axis of said partial elliptical portion, whereby the resilience of said spring is varied, said adjustably positioned means comprising a resilient member of elliptical cross-section and extending within said partial elliptical portion, the cross-section axial dimensions of said member being such that when the major axis of the said partial elliptical portion and said member coincide, a minimum force is exerted by said member within said partial elliptical portion and when said major axis of said partial elliptical portion and said member are at right angles to each other, an increased force is exerted by said member to lengthen the spacing at the minor axis of said partial elliptical portion and thereby vary the resilience of said spring.

4. The combination defined in claim 3 and further characterized by the said adjustably positioned means and said partial elliptical portion being coated with a material having a low co-efficient of friction.

References Cited in the file of this patent

UNITED STATES PATENTS

| | | |
|---|---|---|
| 1,501,583 | Childs | July 15, 1924 |
| 1,893,098 | Murray et al. | Jan. 3, 1933 |
| 2,363,837 | Dougherty | Nov. 28, 1944 |
| 3,039,221 | Musgrave | June 19, 1962 |

FOREIGN PATENTS

| | | |
|---|---|---|
| 878,132 | Germany | June 1, 1953 |